(12) United States Patent
Nemoto et al.

(10) Patent No.: US 6,767,666 B2
(45) Date of Patent: Jul. 27, 2004

(54) LITHIUM SECONDARY CELL AND LITHIUM SECONDARY CELL CONNECTING STRUCTURE

(75) Inventors: Hiroshi Nemoto, Nagoya (JP); Kenshin Kitoh, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 79 days.

(21) Appl. No.: 10/095,783

(22) Filed: Mar. 12, 2002

(65) Prior Publication Data

US 2002/0136944 A1 Sep. 26, 2002

(30) Foreign Application Priority Data

Mar. 21, 2001 (JP) .......................................... 2001-080635
Mar. 7, 2002 (JP) .......................................... 2002-061485

(51) Int. Cl.[7] ........................ H01M 10/50; H01M 4/00; H01M 6/42
(52) U.S. Cl. ........................... 429/120; 429/94; 429/149
(58) Field of Search ............................ 429/120, 94, 149

(56) References Cited

U.S. PATENT DOCUMENTS 5,468,571 A * 11/1995 Fujimoto et al. ........... 429/217
5,866,276 A * 2/1999 Ogami et al. ............... 429/120
6,010,800 A * 1/2000 Stadnick et al. ............ 429/120
6,139,986 A * 10/2000 Kurokawa et al. ........... 429/61

FOREIGN PATENT DOCUMENTS

JP         2000-90976         3/2000

* cited by examiner

*Primary Examiner*—Patrick Ryan
*Assistant Examiner*—Thomas H. Parsons
(74) *Attorney, Agent, or Firm*—Burr & Brown

(57) ABSTRACT

A lithium secondary cell includes an inner electrode body impregnated with a non-aqueous electrolyte. The inner electrode body includes a positive electrode and a negative electrode wound or laminated together with a separator inserted therebetween. A cell case contains the inner electrode body and includes an electrode cover sealing the inner electrode body and is provided with cell covers, external terminals and internal terminals. The lithium secondary cell is provided with a unit for cooling the electric current path. The lithium secondary cell is capable of preventing a lowering of performance and extending the service life by preventing heating of the lithium secondary cell and maintaining the cell temperature within an adequate range.

14 Claims, 4 Drawing Sheets

LITHIUM SECONDARY CELL AND LITHIUM SECONDARY CELL CONNECTING STRUCTURE

This application claims the benefit of Japanese Applications 2001-080635, filed Mar. 21, 2001, and 2002-061485, filed Mar. 7, 2002, the entireties of which are incorporated herein by reference.

BACKGROUND OF THE INVENTION AND RELATED ART STATEMENT

The present invention relates to a lithium secondary cell (hereinafter simply referred to as "cell") and a lithium secondary cell connecting structure (hereinafter simply referred to as "connecting structure"), and more particularly, to a lithium secondary cell and a lithium secondary cell connecting structure capable of preventing a lowering of performance due to the use and extending its service life.

Lithium secondary cells are widely used as power supplies for portable communication apparatuses and electronic devices such as notebook personal computers in recent years. Furthermore, the development of lithium secondary cells is underway as motor drive batteries for electric vehicles and hybrid electric vehicles (hereinafter simply referred to as "electric vehicle, etc.") in response to a growing international demand for resource saving and energy saving to protect the global environment. This lithium secondary cell is used for a connecting structure made up of a plurality of cells connected in series to secure a voltage necessary to drive the motor. Since the service life of an electric vehicle, etc. is estimated to be about 5 to 10 years, this lithium secondary cell and the lithium secondary cell connecting structure are expected to have their service life equivalent to that of the electric vehicle, etc.

This lithium secondary cell has a high operating voltage and high energy density, having an advantage of being able to discharge a high current, while it has a disadvantage of generating great heat, liable to cause a temperature rise of the battery. This temperature rise due to heating is attributable to inner resistance of the inner electrode body generated when a current flows. When the inner electrode body is continuously exposed to a high temperature state caused by the temperature rise, its internal resistance further increases, which causes the inconvenience of eventually reducing the battery capacity and drastically reducing performance.

However, despite such inconvenience of the lithium secondary cell, it is the current situation that heating prevention measures are not taken sufficiently accompanied by problems of an inevitable lowering of performance due to the use and short service life. Furthermore, the lithium secondary cell connecting structure needs to provide space between cells to facilitate the heat dissipation of each lithium secondary cell, which causes a problem of poor volumetric efficiency of the connecting structure.

SUMMARY OF THE INVENTION

The present invention has been implemented in view of the above-described conventional problems and it is an object of the present invention to provide a lithium secondary cell and a lithium secondary cell connecting structure intended to prevent heating of the lithium secondary cell and the lithium secondary cell connecting structure to maintain their temperature within an appropriate range so as to prevent a lowering of the performance due to the use and extend their service life.

That is, the present invention provides a lithium secondary cell comprising: an inner electrode body impregnated with a non-aqueous electrolyte, made up of a positive electrode and a negative electrode wound or laminated together with a separator inserted in between, a cell case that contains the inner electrode body and an electrode cover that seals the inner electrode body provided with a cell cover, external terminals and internal terminals characterized by including a means for cooling the electric current path. In the present invention, it is preferable that the electric current path includes the external terminals.

According to the present invention, there is further provided a lithium secondary cell comprising: an inner electrode body impregnated with a non-aqueous electrolyte, made up of a positive electrode and a negative electrode wound so as to surround an outer wall of a core with a separator inserted in between, and a cylindrical cell case that coaxially contains the inner electrode body; wherein a heat conductivity ratio (X/Y) of a heat conductivity (X) in a direction of the center axis to a heat conductivity (Y) in a direction of a diameter of the lithium secondary cell is 50 or more. In the present invention, it is preferable that the heat conductivity ratio (X/Y) is 100 or more.

This configuration condition is ideally applicable to a lithium secondary cell having a capacity of 2 Ah or more and ideally mounted on a vehicle to start an engine and ideally used for an electric vehicle or hybrid electric vehicle.

Furthermore, the present invention provides a lithium secondary cell connecting structure constructed of a plurality of lithium secondary cells connected in series and/or in parallel by means of a bus bar, with the lithium secondary cell comprising an inner electrode body impregnated with a non-aqueous electrolyte, made up of a positive electrode and a negative electrode wound or laminated together with a separator inserted in between, a cell case that contains the inner electrode body and an electrode cover that seals the inner electrode body provided with a cell cover, external terminals and internal terminals, characterized by including a means for cooling the electric current path. In the present invention, it is preferable that the electric current path includes the bus bar.

This configuration condition is ideally applicable to a lithium secondary cell having a capacity of 2 Ah or more and ideally mounted on a vehicle to start an engine and ideally used for an electric vehicle or hybrid electric vehicle.

DETAILED DESCRIPTION OF THE INVENTION

The lithium secondary cell of the present invention comprises an inner electrode body impregnated with a non-aqueous electrolyte, made up of a positive electrode and a negative electrode wound or laminated together with a separator inserted in between, a cell case that contains the inner electrode body and an electrode cover that seals the inner electrode body provided with a cell cover, external terminals and internal terminals, and the lithium secondary cell connecting structure is constructed of a plurality of the above-described lithium secondary cells connected in series and/or in parallel by means of a bus bar.

Therefore, their materials and structures have no restrictions. The main components and structures of the cell and the connecting structure will be explained below.

Figure 4:
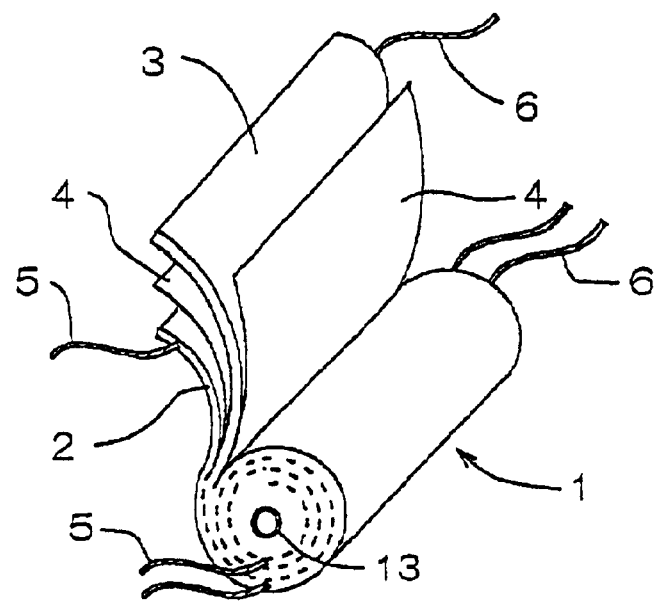
FIG. 4 is a perspective view showing an embodiment of a wind type inner electrode body.
Figure 5:
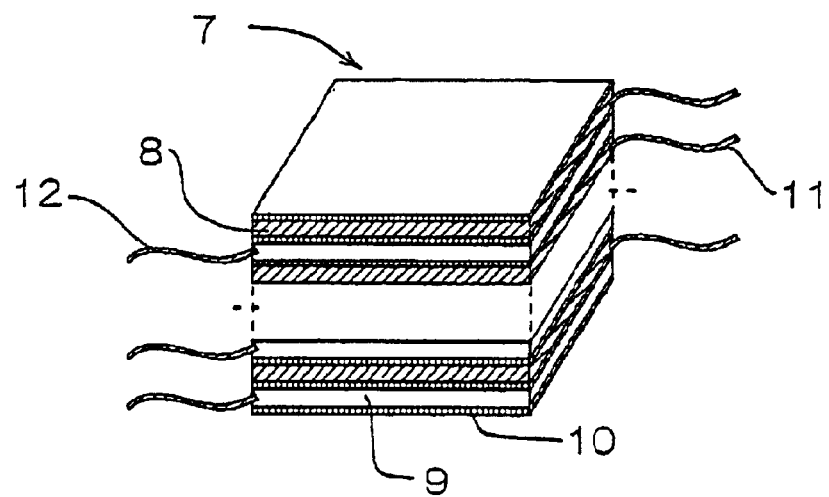
FIG. 5 is a perspective view showing an embodiment of a laminate type inner electrode body.

The wind type inner electrode body used in the present invention is constructed, as shown in FIG. 4, of a positive electrode 2 and negative electrode 3 (hereinafter referred to as "electrode plates 2 and 3") with a separator 4 made of porous polymers inserted in between to prevent the positive electrode 2 and negative electrode 3 from directly touching each other, wound around the outer wall of a core 13. On the other hand, the laminate type inner electrode body 7 used in the present invention is constructed, as shown in FIG. 5, of positive electrodes 8 and negative electrodes 9 each having a predetermined area and shape laminated one atop another with separators 10 inserted in between. The materials used and manufacturing method of the positive electrodes 8 and negative electrodes 9 are the same as those of the wind type inner electrode body 1.

The positive electrode 2 is created by applying a positive electrode active material to both sides of a collector substrate. As the collector substrate, a metal foil such as aluminum foil or titanium foil is used, which has excellent corrosion resistance to positive electrochemical reactions. Instead of a foil, a punching metal or mesh can also be used. Furthermore, as a positive electrode active material, a lithium transition metal compound oxide such as lithium manganese oxide ($LiMn_2O_4$) or lithium cobalt oxide ($LiCoO_2$) is preferably used and it is desirable to add carbon micro powder such as acetylene black to these substances as a conductive assistant.

The negative electrode 3 can be created in the same way as for the positive electrode 2. As the collector substrate for the negative electrode 3, a metal foil such as a copper foil or nickel foil, which has excellent corrosion resistance to negative electrode electrochemical reaction is preferably used. As the negative electrode active material, an amorphous carbon material such as soft carbon or hard carbon or high graphitized carbon powder such as artificial graphite or natural graphite is preferably used.

As the separator 4, one with a three-layer structure with a Li ion ($Li^+$) conducting polyethylene film (PE film) with micro pores sandwiched between porous Li ion ($Li^+$) conducting polypropylene films (PP film) is preferably used.

When the separator 4 is inserted between the electrode plates 2 and 3, a positive electrode collector tab 5 and negative electrode collector tab 6 (hereinafter also referred to as "collector tabs 5 and 6") are attached to the parts of the electrode plates 2 and 3 where no electrode active materials are applied and the collector substrate is exposed. Similarly, FIG. 5 shows that positive and negative electrode collector tabs 11 and 12 each extend from portions of positive and negative electrodes 8 and 9, respectively. As the collector tabs 5 and 6, foil-like tabs made of the same material used for the electrode plates 2 and 3 are preferably used. In the wind type electrode body 1 of FIG. 4, a plurality of each of the collector tabs 5 and 6 are shown. Though only one collector tab 5 and one collector tab 6 are required in the wind type electrode body 1, inner resistance of a cell can be reduced by increasing the number of the collector tabs 5 and 6. It is further preferable to attach collector tabs 5 and 6 in a plurality of portions of each of the electrode plates 2 and 3 because of good heat conductivity.

As the non-aqueous electrolyte, it is preferable to use a single solvent or a mixture solvent of those of the carbonic acid ester system such as ethylene carbonate (EC), diethyl carbonate (DEC), dimethyl carbonate (DMC) and propylene carbonate (PC), or γ-butyrolactone, tetrahydrofuran, acetonitrile, etc.

As the electrolyte, lithium complex fluorine compound such as lithium hexafluoro phosphate ($LiPF_6$) or lithium fluoroborate ($LiBF_4$), or lithium halide compound such as lithium perchlorate ($LiClO_4$) is included and one, two or more types of these substances are dissolved into the above-described solvent for use. It is especially desirable to use $LiPF_6$ which is hardly subject to oxidation or decomposition and shows high lithium ion conductivity in the non-aqueous electrolyte.

Figure 1:
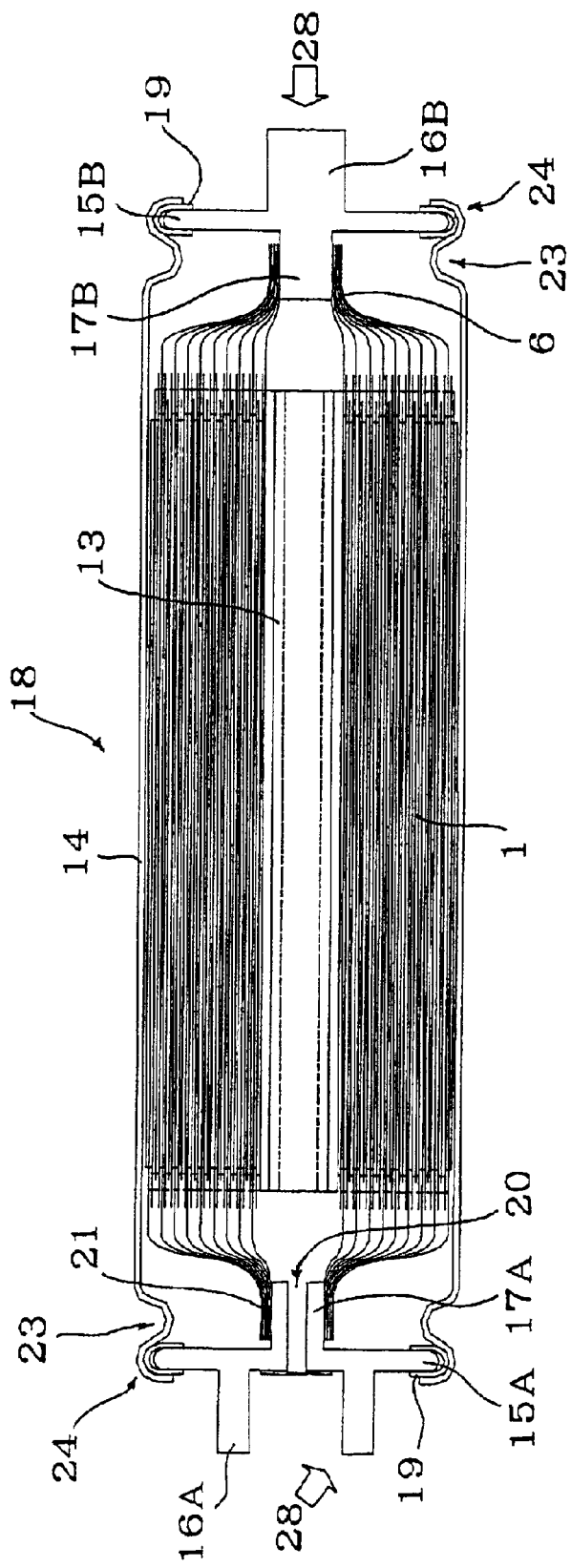
FIG. 1 is a sectional view showing an embodiment of a lithium secondary cell of the present invention.

As shown in FIG. 1, the electrode cover includes cell covers 15A and 15B to cover the cell, inner terminals 17A and 17B to collect current temporarily inside the cell, and external terminals 16A and 16B to extract current to the outside of the cell. FIG. 1 shows that a pressure release hole 20 is provided at a central portion of cell cover 15A. An elastic member 19 is provided around the outer circumferential surface portions of cell covers 15A and 15B to prevent the cell covers from directly contacting the inner surfaces of grooved and crimped portions 23 and 24, respectively, of cell case 14. The materials forming the electrode covers can preferably include an alloy of aluminum for the positive electrode cover, or copper or nickel or an alloy with either of them for the negative electrode cover in view of chemical reactions for each electrode. Any metal can be used without problems as far as its purity is at least 90%.

For the cell case, a metal pipe is preferably used and aluminum pipe or stainless steel pipe is preferably used. Since a metal material is used as the cell case in this way, it is desirable to insert an insulation polymer film between the inner surface of the cell case and the outer region of the inner electrode body to prevent conduction between the inner electrode body and cell case and conduction between the collector tab and cell case.

For manufacturing the cell, the metal foil portions 21 of the collector tabs are attached at both ends of the inner electrode body and are connected to the inner terminals of the electrode cover to create a cell element first and this cell element is inserted into the cell case and is held in a stable position. Then, the cell element is impregnated with a non-aqueous electrolyte and the electrode cover and the cell case are jointed to seal the inner electrode body.

Figure 2:
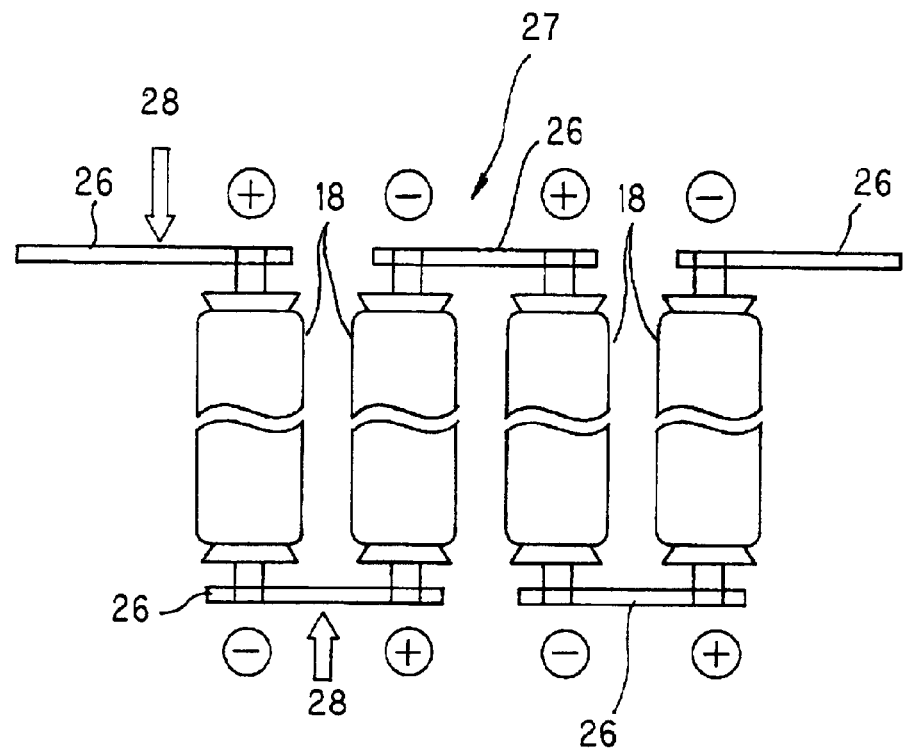
FIG. 2 is a schematic top view showing an embodiment of a lithium secondary cell connecting structure of the present invention.
Figure 3:
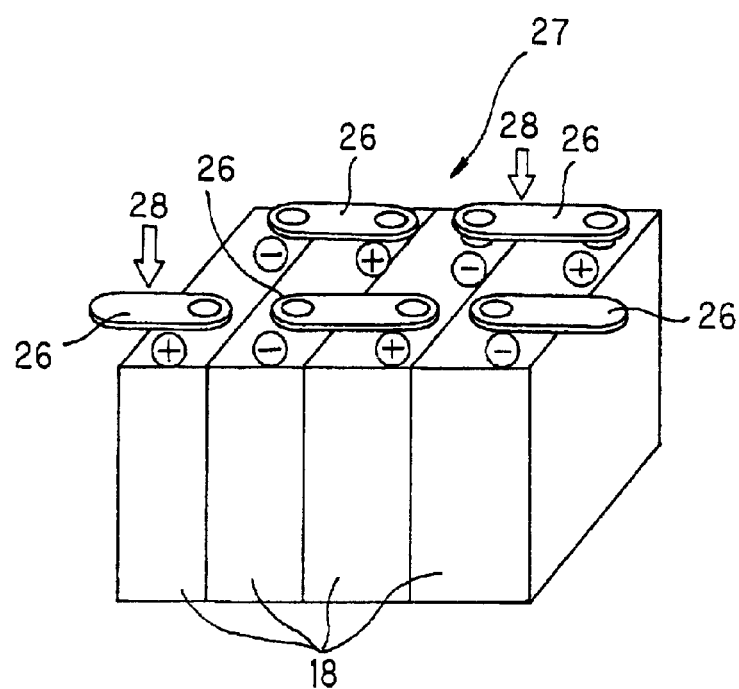
FIG. 3 is a schematic perspective view showing another embodiment of the lithium secondary cell connecting structure of the present invention.

A shown in FIGS. 2 and 3, the lithium secondary cell connecting structure refers to a plurality of cells connected in series with a positive external terminal of one lithium secondary cell connected with a negative external terminal of another lithium secondary cell. For connection of these cells, a bus bar 26 can be preferably used. For this bus bar 26, a metal material with high conductivity and small connection resistance with respect to the external terminal is used and its material is selected from the material of the external terminal. If an aluminum external terminal is used, aluminum is preferably used for the bus bar 26, too, while an external terminal is made of copper, copper is preferably used for the bus bar 26, too. Furthermore, when different materials are used for external terminals positive electrodes and negative electrodes, it is also possible to use a connector made of different types of material such as a clad material (e.g., connector with aluminum and copper). With regard to the shape of the bus bar 26, it is possible to use a tabular type, a punching metal or mesh. It is preferable to use a bus bar of punching metal or mesh because such a bus bar has a large surface area, thereby improving the cooling efficiency of the bus bar.

When this connecting structure 27 is used, it is possible to accommodate cells 18 by piling one atop another in vertical direction or connecting one after another in horizontal direction with the cells 18 fixed with an appropriate frame, and thus accommodate multiple cells 18 compactly.

According to the lithium secondary cell having the above-described components and structure, lithium ions moving through the inner electrode body causes a current to flow and temperature to rise in the cell, which further accelerates the movement of lithium ions and allows the current to flow more easily. Thus, once a temperature gradient is produced in the cell, a current flows more easily in the high temperature area than other areas and in this way currents are concentrated on the high temperature area, which further heats up the high temperature area, which causes more currents to concentrate on the high temperature area, producing a vicious cycle in this way. As a result, the capacity of the lithium secondary cell reduces and its performance also deteriorates.

FIG. 1 shows the lithium secondary cell 18 having a wind type inner electrode body 1. This lithium secondary cell 18 houses the inner electrode body 1 in an aluminum or stainless steel cell case 14 with both ends of the cell case 14 sealed with aluminum electrode covers or aluminum or copper electrode covers. As shown in FIG. 4, the wind type inner electrode body is constructed of a wind body wound around the outer wall of an aluminum core 13, comprising an aluminum positive electrode 2 and a copper or nickel negative electrode 3 to which an electrode active material is applied, with a resin separator 4 inserted between the positive and negative electrodes and a plurality of aluminum positive electrode collector tabs 5 and a plurality of copper or nickel negative electrode collector tabs 6 to deliver current to the outside connected at both ends of the wind body. The collector tabs 5 and 6 of the positive electrode and negative electrode of this inner electrode body 1 are connected to their respective electrode covers by welding or other method.

In the case of the center axis direction of the cell, heat produced inside this lithium secondary cell is dissipated from the surface of the cell through the electric current path. The heat transfer path in this case is the same as the electric current path constructed of the members such as the positive electrode, negative electrode, positive electrode collector tab, negative electrode collector tab, internal terminals and external terminals. Since all of these members are made of metal, the heat transfer path has a structure that facilitates heat transfer in the direction of the center axis of the cell. On the other hand, in the case of the diameter direction of the cell, heat produced inside must traverse the wind body of the inner electrode body to be dissipated from the surface of the cell to the outside. The heat transfer path in this case includes areas with lower heat conductivity than metallic parts such as the laminated structure of the positive electrode and negative electrode, electrode active material, electrolyte and separator, and has a structure that suppresses heat transfer compared to the center axis direction. The result of a calculation performed by the present inventor et al. using the lithium secondary cell 18 in FIG. 1 shows that heat conductivity inside the cell is 34.0 W/m·K in the center axis direction of the cell while it is 0.30 W/m·K in the diameter direction of the cell, resulting in a heat conductivity ratio (center axis direction/diameter direction of the cell) of 113.

The same tendency of the above-described heat transfer path and heat conductivity applies to the lithium secondary cell using the laminate type inner electrode body.

The lithium secondary cell of the present invention is constructed in such a way as to include a means for cooling the electric current path. It is preferable that the aforementioned electric current path to be cooled includes an external terminal. More specifically, as shown in FIG. 1, it is preferable that the lithium secondary cell is provided with the aforementioned cooling means in such a manner that the cooling means 28 cools the external terminals 16A and 16B. This structure makes it possible to effectively remove the heat produced inside the lithium secondary cell through the heat transfer path, that is, the electric current path in the center axis direction of the cell having high heat conductivity. Thus, the present invention can prevent a lowering of performance and extend the service life of the lithium secondary cell.

Figure 6:
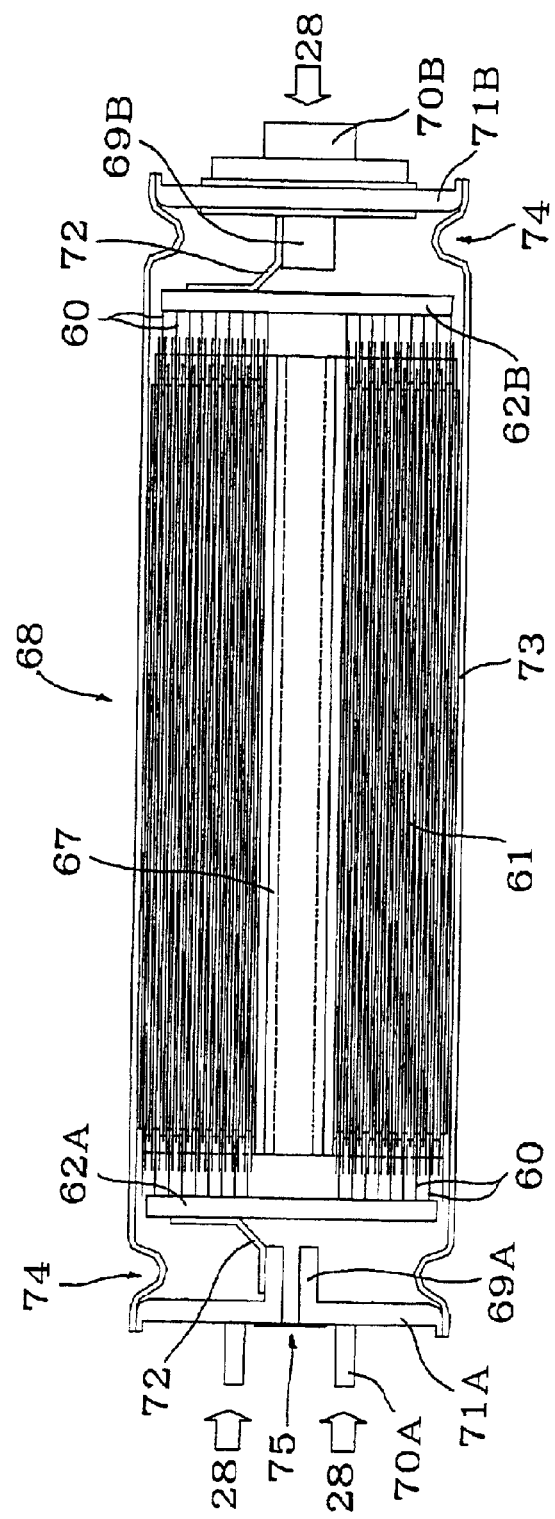
FIG. 6 is a sectional view showing another embodiment of a lithium secondary cell of the present invention.

In addition, in the present invention, as shown in FIG. 6, a lithium secondary cell 68 includes a cell casing 73 housing an inner electrode body 61 (wind type inner electrode body) impregnated with a non-aqueous electrolyte. The positive electrode and negative electrode of the inner electrode body are each made of at least one metallic foil 60 and wound or laminated around core 67. A positive eletode cell cover 71A includes positive internal and external electrode terminals 69A and 70A, respectively. A pressure release hole 75 is provided through a portion of positive electrode cell cover 71A. A negative electrode cell cover 71B includes negative internal and external electrode terminals 69B and 70B, respectivly. The portions of cell casing 73 proximate the positive and negative electrode cell covers 71A and 71B, respectively, include crimped portions 74. A positive electrode collector member 62A and a negative electrode collector member 62B are provided for drawing out a current from the wind type inner electrode body 61 by connecting an edge of the aforementioned metallic foil 60 to a predetermined portion of the positive electrode collector member 62A and/or a negative electrode collector member 62B. The electrode connector members are further structured to connect an edge (joint edge) disposed to be connected with a predetermined portion of the positive electrode collector member 62A and/or the negative electrode collector member 62B among an edge of the metallic foil 60 with the predetermined portion of the positive electrode collector member 62A and/or a negative electrode corrector member 62B. The positive external terminal 70A and negative external terminal 70B are preferably cooled with a cooling means 28. That is, a lithium secondary cell of the present invention is preferable because it has a short heat transmission path, is excellent in cooling efficiency, and is superior in volume efficiency to a lithium secondary cell having a structure using a collector tab since an edge face of each of metallic foils constituting a positive electrode plate and a negative electrode plate is directly connected with an electricity collector member without using collector tabs 5, 6 shown in FIG. 1 to collect electricity from a plurality of portions of the electrode plates.

Incidentally, a laser welding or the like is suitably adopted for connecting an edge of the aforementioned metallic foil with a predetermined portion of the both electrode collector members. Though FIG. 6 shows a state where a positive electrode collector member 62A is connected with a positive inner terminal 69A, and a negative electrode collector member 62B is connected with a negative electrode inner terminal 69B by means of an electrode lead member 72; they may be connected directly with each other.

By the way, the cooling means is not limited to a particular type, but can be any means if it can at least cool the external terminals of the lithium secondary cell appropriately. Such a means includes an adequately cooled gas or liquid or a cooling apparatus using electricity or gas, etc. as the energy source, and more particularly an air blower or an apparatus with cooling fins provided so as to cool mainly the electric current path, that is, the external terminals. Further, a cooling apparatus using electricity as an energy source is exemplified by a Peltier element.

According to the present invention, there is also provided a lithium secondary cell comprising: an inner electrode body impregnated with a non-aqueous electrolyte, made up of a positive electrode and a negative electrode wound so as to surround an outer wall of a core with a separator inserted in between, and a cylindrical cell case that coaxially contains said inner electrode body; wherein a heat conductivity ratio (X/Y) of a heat conductivity (X) in a direction of the center axis to a heat conductivity (Y) in a direction of a diameter of said lithium secondary cell is 50 or more. The present invention is hereinbelow described in detail.

The aforementioned heat conductivities in a direction of the center axis and in a direction of a diameter are synthetic heat conductivities calculated, with respect to each direction, from values of a heat conductivity and a thickness (length) of each member constituting the lithium secondary cell. A heat conductivity of each member depends on the quality of the materials, porosities, etc., and is greatly influenced particularly by the heat conductivities of a positive active material and a negative active material, the quality of the materials and the porosities of the members constituting the positive active material and the negative active material. In addition, since a synthetic heat conductivity depends on a thickness (length) of the members, a heat conductivity sometimes differs even if the same kind of material is used.

It is general that a lithium secondary cell provided with a wind type inner electrode body has a longer heat transmission path in a direction of the center axis in comparison with a heat transmission path in a direction of a diameter. Specifically, the length of heat transmission path in the direction of a center axis is about several to ten times longer than that in the direction of a diameter.

A lithium secondary cell of the present invention is characterized in that a lowering of performance can be prevented to give a long service life by suppressing generation of heat with its excellent cooling efficiency because a heat conductivity ratio (X/Y) of a heat conductivity (X) in a direction of the center axis to a heat conductivity (Y) in a direction of a diameter of said lithium secondary cell is 50 or more, that is, a heat conductivity (X) in a direction of the center axis is sufficiently high in comparison with a heat conductivity (Y) in a direction of a diameter of said lithium secondary cell. In addition, it is further preferable that the cell is provided with, for example, a cooling means to cool an electric current path because heat inside the cell is emitted more effectively. Incidentally, it is preferable that the heat conductivity ratio (X/Y) of a heat conductivity (X) in a direction of the center axis to a heat conductivity (Y) in a direction of a diameter is 100 or more in view of enhancing cooling effect.

The configuration condition of the lithium secondary cell of the present invention is also preferably used for a cell having a capacity of 2 Ah or more. It goes without saying that the application of the cell is not limited to a particular field. This cell can be used ideally to start an engine and, above all, to drive the motor of an electric vehicle or hybrid electric vehicle in particular as a car-mounted large capacity cell requiring the ability to prevent a lowering of performance for a long period of time.

Furthermore, the lithium secondary cell connecting structure of the present invention is constructed in such a way as to include a means for cooling the electric current path. The electric current path to be cooled preferably includes a bus bar. More specifically, as shown in FIG. 2 and FIG. 3, it is preferable that the lithium secondary cell connecting structure is constructed in such a manner that the cooling means 28 cools the bus bar 26. This structure makes it possible to effectively remove heat produced inside the lithium secondary cell through the heat transfer path in the center axis direction of the cell, that is, the electric current path. Thus, the present invention can prevent a lowering of performance and extend the service life of the lithium secondary cell connecting structure.

As in the case of the lithium secondary cell, the cooling means is not limited to a particular means, but can be any means if it can at least cool the bus bar adequately. More specifically, the cooling means similar to the one for the lithium secondary cell can be used.

Furthermore, it goes without saying that it is further desirable that the lithium secondary cell of the present invention includes a means for cooling the electric current path of the lithium secondary cell and the lithium secondary cell connecting structure of the present invention includes a means for cooling the electric current path of the lithium secondary cell connecting structure.

The lithium secondary cell connecting structure of the present invention need not be provided with a space for heat dissipation between cells as in the case of conventional art and the connection body can be manufactured in such a way that there is no gap between cells. Therefore, the connection body 27 using the laminate type electrode body as shown in FIG. 3 can implement the connection body 27 with no gaps between the cells 18.

The configuration condition of the lithium secondary cell connection body of the present invention can also be ideally used for a connecting structure with a cell capacity of 2 Ah or more. It goes without saying that the application of the lithium secondary cell connection body is not limited to a particular field. This cell can be used ideally to start an engine and, above all, to drive the motor of an electric vehicle or hybrid electric vehicle in particular as the connection body of car-mounted large capacity cells requiring the ability to prevent a lowering of performance for a long period of time.

As described above, the lithium secondary cell and the lithium secondary cell connection body of the present invention prevent heating of the lithium secondary cells and the lithium secondary cell connection body, maintains the temperature within an appropriate range, and can thereby prevent a lowering of performance and extend the service life.

What is claimed is:

1. A lithium secondary cell, comprising:
   an inner electrode body impregnated with a non-aqueous electrolyte and comprising a positive electrode and a negative electrode wound or laminated together with a separator inserted between said positive and negative electrodes;
   a cell case that contains said inner electrode body; and
   an electrode cover that seals said inner electrode body provided with a cell cover external terminals and internal terminals, wherein said lithium secondary cell is provided with means for cooling an electric current path, and said electric current path includes said external terminals.

2. The lithium secondary cell according to claim 1, wherein said lithium secondary cell has a capacity of 2 Ah or more.

3. The lithium secondary cell according to claim 1, wherein said lithium secondary cell is to be mounted on a vehicle.

4. The lithium secondary cell according to claim 3, wherein said lithium secondary cell is to be used to start an engine.

5. The lithium secondary cell according to claim 3, wherein said lithium secondary cell is used for an electric vehicle or hybrid electric vehicle.

6. A lithium secondary cell, comprising:
   an inner electrode body impregnated with a non-aqueous electrolyte and comprising a positive electrode and a negative electrode wound so as to surround an outer wall of a core with a separator inserted between said positive and negative electrodes, and a plurality of current collecting portions extending from at least one end of each of said positive and negative electrodes; and
   a cylindrical cell case that coaxially contains said inner electrode body,
   wherein a heat conductivity ratio (X/N) of a heat conductivity (X) in a direction of the center axis to a heat conductivity (Y) in a direction of a diameter of said lithium secondary cell is 50 or more.

7. The lithium secondary cell according to claim 6, wherein said heat conductivity ratio (X/Y) is 100 or more.

8. The lithium secondary cell connecting structure according to claim 6, wherein parts of the lithium secondary cell that define an electric current path in the center axis direction of the lithium secondary cell comprise high heat conductive members.

9. A lithium secondary cell connecting structure comprising a plurality of lithium secondary cells connected in series and/or in parallel by means of a bus bar, each of said lithium secondary cells comprising:
   an inner electrode body impregnated with a non-aqueous electrolyte and comprising a positive electrode and a negative electrode wound or laminated together with a separator inserted between said positive and negative electrodes;
   a cell case that contains said inner electrode body; and
   an electrode cover that seals said inner electrode body provided with a cell cover, external terminals and internal terminals,
   wherein said lithium secondary cell connecting structure is provided with means for cooling an electric current path, and said electric current path includes said external terminals.

10. The lithium secondary cell connecting structure according to claim 9, wherein said electric current path includes said bus bar.

11. The lithium secondary cell connecting structure according to claim 9, wherein said lithium secondary cell has a capacity of 2 Ah or more.

12. The lithium secondary cell connecting structure according to claim 9, wherein said lithium secondary cell connecting structure is to be mounted on a vehicle.

13. The lithium secondary cell connecting structure according to claim 12, wherein said lithium secondary cell connecting structure is to be used to start an engine.

14. The lithium secondary cell connecting structure according to claim 12, wherein said lithium secondary cell connecting structure is used for an electric vehicle or hybrid electric vehicle.

* * * * *

UNITED STATES PATENT AND TRADEMARK OFFICE
CERTIFICATE OF CORRECTION

PATENT NO.     : 6,767,666 B2
DATED           : July 27, 2004
INVENTOR(S)  : Hiroshi Nemoto and Kenshin Kitoh It is certified that error appears in the above-identified patent and that said Letters Patent is hereby corrected as shown below:

<u>Column 9,</u>
Line 27, please replace "(X/N)" with -- (X/Y) --.

Signed and Sealed this

Twenty-sixth Day of April, 2005

JON W. DUDAS
*Director of the United States Patent and Trademark Office*